(12) United States Patent
De Jong

(10) Patent No.: US 7,569,156 B2
(45) Date of Patent: Aug. 4, 2009

(54) PROCESS FOR THE MANUFACTURE OF SYNTHESIS GAS BY PARTIAL OXIDATION OF A LIQUID HYDROCARBON-CONTAINING FUEL USING A MULTI-ORIFICE BURNER

(75) Inventor: Johannes Cornelis De Jong, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/776,899

(22) Filed: Jul. 12, 2007

(65) Prior Publication Data

US 2008/0054224 A1   Mar. 6, 2008

(30) Foreign Application Priority Data

Jul. 14, 2006   (EP)   .................. 06117198

(51) Int. Cl.
*C01B 3/24* (2006.01)
(52) U.S. Cl. ...................................... 252/373
(58) Field of Classification Search ................ 252/373
See application file for complete search history.

(56) References Cited

U.S. PATENT DOCUMENTS 4,523,529 A   6/1985   Poll

| 4,789,384 | A | * | 12/1988 | Martens et al. | ........... 48/197 R |
| 4,836,831 | A | * | 6/1989 | Martens | ..................... 48/197 R |
| 4,888,031 | A | * | 12/1989 | Martens | ..................... 48/197 R |
| 5,653,916 | A | * | 8/1997 | Disselhorst et al. | ......... 252/373 |
| 2008/0035890 | A1 | * | 2/2008 | Martens | ..................... 252/373 |

FOREIGN PATENT DOCUMENTS

| DE | 2935754 | 6/1980 |
| EP | 545281 | 6/1993 |
| EP | 759886 | 7/1998 |
| GB | 1413996 | 1/1975 |
| WO | WO95/32148 | 11/1995 |

\* cited by examiner

*Primary Examiner*—Wayne Langel
(74) *Attorney, Agent, or Firm*—Charles W. Stewart

(57) ABSTRACT

The invention is directed to a process to prepare a mixture of hydrogen and carbon monoxide by performing a partial oxidation on a hydrocarbon feed using a multi-orifice burner provided with an arrangement of separate passages, wherein the hydrocarbon flows through a passage of the burner, an oxidiser gas flows through a separate passage of the burner and wherein the passage for hydrocarbon feed and the passage for oxidiser gas are separated by a passage through which a moderator gas flows and wherein the exit velocity of the moderator gas is greater than the exit velocity of the oxidiser gas.

14 Claims, 1 Drawing Sheet

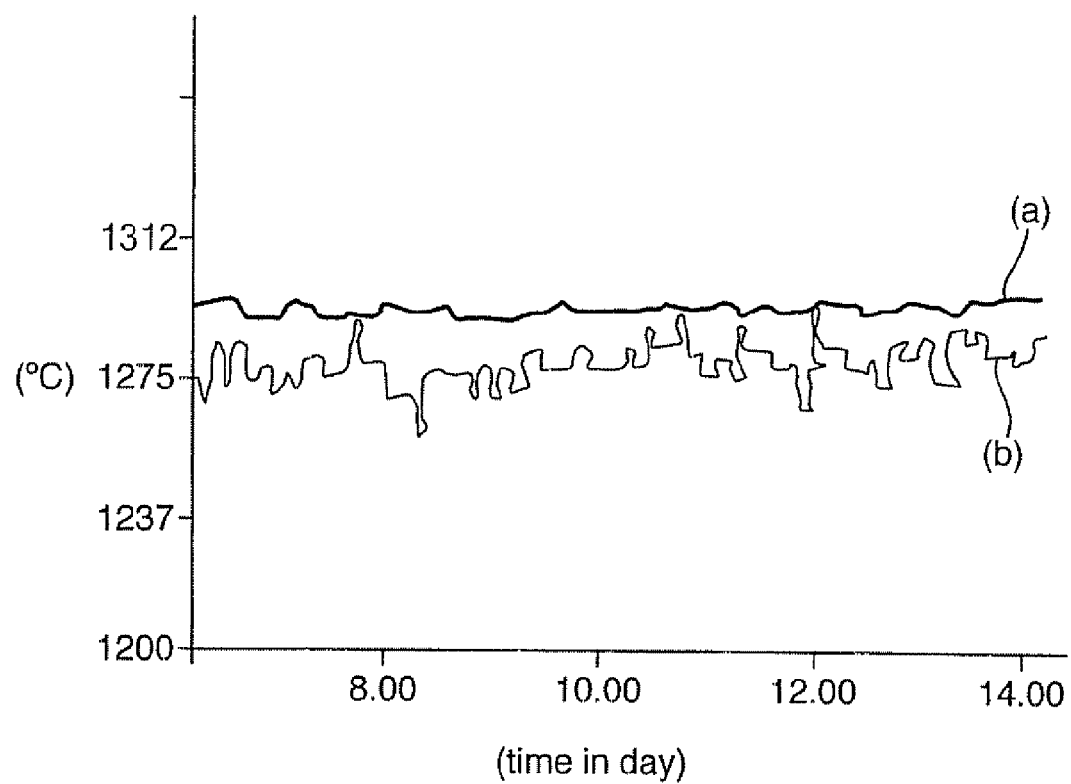

PROCESS FOR THE MANUFACTURE OF SYNTHESIS GAS BY PARTIAL OXIDATION OF A LIQUID HYDROCARBON-CONTAINING FUEL USING A MULTI-ORIFICE BURNER

The invention relates to a process for the manufacture of synthesis gas by partial oxidation of a liquid hydrocarbon-containing fuel using a multi-orifice burner.

Such process is described in EP-A-759886. This publication describes a process for partial oxidation of a liquid, hydrocarbon-containing fuel such as oil residue wherein an oxygen-containing gas which is applied as an oxidizer, and a liquid, hydrocarbon-containing fuel are supplied to a gasification zone through a multi-orifice (co-annular) burner comprising a concentric arrangement of n passages or channels coaxial with the longitudinal axis of said burner, wherein n is an integer>3, and wherein autothermically a gaseous stream containing synthesis gas is produced under appropriate conditions.

In the process of EP-A-759886 an oxygen containing gas, applied as oxidiser, a liquid, hydrocarbon-containing fuel and a moderator gas is supplied to separate channels of a multi-orifice (co-annular) burner having 6 passages. The fuel is passed through passage 4, wherein passage 1 is the innermost passage, at a velocity between 8 and 12 m/s. The oxygen containing gas is passed through passage 1 at a velocity of 30-40 m/s and through passage 2 and 6 at a velocity of between 80 and 120 m/s. The moderator gas is passed through passage 3 and 5 at a velocity of between 25-35 m/s.

Although the process of EP-A-759886 is directed to improve the burner lifetime by lifting the flame from the front of the burner to avoid burner damage room for improvement is present. It was found that when such a state of the art process is used a prolonged burner operation is possible. However in some cases, for example when one wishes to operate the burner at a higher outlet pressure or when processing viscous hydrocarbon feeds or heavy liquid hydrocarbon feed having a high content of volatile components, burner damage still occurs and a shorter lifetime of the burner is experienced. Viscous hydrocarbon feeds require higher feed temperatures in order to be able to supply the feed through the feed channels to the burner. Due to the resulting higher temperature pre-ignition of the feed may occur near the burner tips resulting in trip retraction.

It is thus an object of the present invention to provide a process wherein burner damage is further avoided.

This object is achieved with the following process.

A process to prepare a mixture of hydrogen and carbon monoxide by performing a partial oxidation on a hydrocarbon feed using a multi-orifice burner provided with an arrangement of separate passages, wherein the hydrocarbon flows through a hydrocarbon passage of the burner, an oxidiser gas flows through a separate oxidiser gas passage of the burner and wherein the hydrocarbon passage for hydrocarbon feed and the oxidiser gas passage for oxidiser gas are separated by a moderator gas passage through which a moderator gas flows and wherein the exit velocity of the moderator gas is greater than the exit velocity of the oxidiser gas.

FIG. 1 presents two plots of temperature fluctuations in the operation of two gasification reactors with one (line a) operated according to the invention and the other (line b) operated according to a prior art process.

Applicants found that by performing the process according the invention substantially improved lifetime is observed when compared to burners operating under the conditions of the state of the art process. Furthermore less temperature fluctuations are observed in the reactor when performing the process of the invention. This is an indication that less flame mode changes are present. Frequent changes in flame modes are indicative for an operation wherein burner damage may occur.

Without wishing to be bound to the following theory but applicants believe that the more stable and less damaging operation of the burner results by using a moderator gas having a high velocity as a separate medium between oxidiser gas and hydrocarbon feed. The moderator gas will break up the hydrocarbon feed and act as a moderator such that reactions in the recirculation zone at the burner tips are avoided. The result will be that the hydrocarbon droplets will only come in contact with the oxidiser gas at some distance from the burner surface. It is believed that this will result in less burner damage, e.g. burner tip retraction. The invention and its preferred embodiments will be further described below.

In the illustrated process of WO-A-9532148 the hydrocarbon feed is broken up by the oxidiser gas having a high velocity. An advantage of the present invention is that the break-up of the liquid hydrocarbon feed into small droplets is more effective due to the fact that the gas stream, i.e. the moderator gas in case of the present invention, having the high velocity exits the burner in a passage adjacent to the passage from which the hydrocarbon feed exits from said burner.

Another advantage of the present process is that the process is more flexible in case the properties of the hydrocarbon feed change during operation or when the operator of the process intends to influence the combustion velocity. For example if one desires a better break-up of the hydrocarbon feed a simple increase in moderator gas velocity would suffice. As explained above the relative velocity of the hydrocarbon feed and the moderator gas is relevant for performing the present invention. Preferably the exit velocity of the moderator gas is at least 5 times the velocity of the hydrocarbon feed. Preferably the exit velocity of the hydrocarbon feed is between 2 and 40 m/s and more preferably between 2 and 20 m/s. The exit velocity of the moderator gas is preferably between 40 and 200 m/s, more preferably between 40 and 150 m/s and even more preferably between 60 and 120 m/s. The exit velocity of the oxidiser gas is preferably between 30 and 150 m/s, more preferably between 30 and 70 m/s and even more preferably between 40 and 70 m/s. A relatively lower oxidiser gas velocity is preferred because it will result in less noise. Applicant have found that the noise of the atomisation due to the high velocity of the moderator gas is much lower than the combustion noise associated with high oxidiser gas velocities, as is the case in for example the process of WO-A-9532148. The respective velocities are measured or calculated at the outlet of the said respective channels into the gasification zone.

Oxidiser gas comprises air or (pure) oxygen or a mixture thereof. With pure oxygen is meant oxygen having a purity of between 95 and 100 vol %. The oxidiser gas preferably comprises of a mixture of said pure oxygen and moderator gas. The content of moderator gas in such a moderator/oxygen mixture gas is preferably between 10 and 30 wt %. As moderator gas preferably steam, water or carbon dioxide or a combination thereof is used. More preferably steam is used as moderator gas.

The presence of some moderator gas in the moderator-pure-oxygen mixture is advantageous because it allows the operator of the process to advantageously increase the velocity of the moderator in an existing burner by reducing the content of moderator gas in the moderator-pure oxygen mixture and increasing the amount of moderator gas as provided to the passages for moderator gas, which passage separates the passage for hydrocarbon feed and the passage for oxidiser gas. Increasing the flow of moderator gas may be advantageous when the viscosity of the hydrocarbon feed increases and a higher velocity is required to achieve break-up of said viscous feed.

The presence of some moderator gas in the moderator-pure-oxygen mixture is also advantageous because it allows the operator of the process to advantageously decrease the velocity of the moderator in an existing burner by redirecting part of the moderator gas from the moderator gas, as provided to the passages for moderator gas, which passage separates the passage for hydrocarbon feed and the passage for oxidiser gas, to the moderator-pure oxygen mixture. Such a decrease in velocity of the moderator gas results for the same feed in larger hydrocarbon droplets, which in turn results in larger soot particles or more soot particles in the resultant mixture of carbon monoxide and hydrogen. Larger soot particles can be more easily be separated from this gas. More soot particles may be required to reduce fouling tendency in downstream equipment. Generally soot particles are separated from the gas by scrubbing with water. It has been found that larger soot particles can in turn be more easily removed from the soot containing water by for example precipitation, liquid cyclones or a decanter centrifuge as described in EP-A-1373441.

Preferably the throughput of the total of moderator gas and the total of pure oxygen relative to the total of hydrocarbon feed remains substantially the same in such above referred to modifications of the process.

The hydrocarbon feed is a liquid, an emulsion or a pumpable slurry at gasifier feed pressure and temperature comprising a carbonaceous component. The carbonaceous component may for example be butanes, pentanes, hexanes, natural gasolines, kerosenes, gas oils, naphthas, diesel fuels, crude oils, residual, whether atmospheric or vacuum, as well as hydrocarbons which may contain other atoms, such as oxygen; however, in such proportions as not to interfere with self-sustaining combustion. Included by definition are slurries of solid carbonaceous fuels in the aforesaid liquid hydrocarbons. Preferred hydrocarbon feeds are heavy crude oil residue, preferably having a kinematic viscosity between 1 and 3000 cSt, preferably between 1 and 1000 cSt as measured at the temperature of the hydrocarbon feed as it is supplied to the burner.

The process is preferably performed in a reactor vessel provided with a multi-orifice burner provided with an arrangement of separate co-annular passages. The burner is preferably arranged at the top end of such a reactor vessel. The vessel itself is preferably a vertically oriented cylindrical vessel having an outlet for the mixture of carbon monoxide and hydrogen at its lower end. Such gasification reactors are well known and are for example described Chapter 5.4 of Gasification, by Chris Higman and Maarten van der Burgt, Elsevier Science (USA), 2003 pages 128-147.

The multi-orifice burner is provided with an arrangement of separate, preferably co-annular passages. Such burner arrangements are known and for example described in EP-A-545281 or DE-OS-2935754. Usually such burners comprise a number of slits at the burner outlet and hollow wall members with internal cooling fluid (e.g. water) passages. The passages may or may not be converging at the burner outlet. Instead of comprising internal cooling fluid passages, the burner may be provided with a suitable ceramic or refractory lining applied onto or suspended by a means closely adjacent to the outer surface of the burner (front) wall for resisting the heat load during operation or heat-up/shut down situations of the burner. Advantageously, the exit(s) of one or more passages may be retracted or protruded.

The burner preferably has 4, 5, 6 or 7 passages. In a preferred embodiment the burner has 6 or 7 passages. In an even more preferred embodiment the burner has 7 passages wherein moderator gas flows through the outer most passage at a velocity of between 5 and 40 m/s. In the embodiment wherein the number of passages are 7, preferably the following streams flow through the below listed passages:

oxidiser flow through the inner most passage 1 and passage 2, moderator gas flow through passage 3, hydrocarbon feed flow through passage 4, moderator gas flow through passage 5, oxidiser flow through passage 6, and moderator gas flow through outer most passage 7, preferably at a velocity of between 5 and 40 m/s.

Alternatively the number of passages is 6 wherein the passage 1 and 2 of the above burner is combined or wherein the passage 7 is omitted.

The process according to the present invention is preferably performed at a syngas product outlet temperature of between 1000 and 1800° C. The pressure of the mixture of carbon monoxide and hydrogen as prepared is preferably between 0.3 and 12 MPa and preferably between 3 and 8 MPa.

The process according to the present invention will preferably be performed near or at a crude oil refinery because the produced synthesis gas can directly be applied as a feedstock for the production of hydrogen or as a fuel gas, for example, for heating the furnaces of the refinery or more efficiently for the firing of gas turbines to produce electricity and heat. Hydrogen as prepared by the above process may be advantageously used in a hydroprocessing process, such as hydrogenation, hydrocracking, isomerisation-dewaxing or catalytic dewaxing type processes.

The mixture of carbon monoxide and hydrogen as prepared, sometimes also referred to as synthesis gas may also be advantageously used as a feedstock for the synthesis of methanol, ammonia or hydrocarbons via the Fischer-Tropsch process, which latter synthesis yields gaseous hydrocarbons and liquid hydrocarbons such as gasoline, middle distillates, lube oils and waxes.

The invention will now be described in more detail by reference to the following example.

EXAMPLE

To two parallel and commercially operated partial oxidation reactors the same crude oil residue feed was provided over a time period of 6 months. One reactor was operated according to the process of the present invention using a burner having 7 passages as summarized in Table 1 and the other reactor was operated according to a process involving a burner having 5 passages as described in Table 2.

In the tables X stands for a mixture of oxygen and steam, F stands for the residue feed and S is pure steam. The inner passage has the lowest 'passage number'. The outer passage has the highest 'passage number'.

TABLE 1

| | passage number | | | | | | |
|---|---|---|---|---|---|---|---|
| | #1 | #2 | #3 | #4 | #5 | #6 | #7 |
| type of reactant | X | X | S | F | S | X | S |
| fraction [%] | 21 | 33 | 35 | 100 | 45 | 46 | 20 |
| exit velocity [m/s] | 22 | 55 | 87 | 6 | 87 | 55 | 20 |

TABLE 2

| | slit number | | | | |
|---|---|---|---|---|---|
| | #1 | #2 | #3 | #4 | #5 |
| type of reactant | X | X | F | X | S |
| fraction [%] | 36 | 32 | 100 | 32 | 100 |
| exit velocity [m/s] | 48 | 73 | 12 | 73 | 56 |

Results

In operation the temperature fluctuations in the two gasification reactors was continuously monitored. In the FIG. 1 it is clear that the temperature fluctuations in the reactor operating according to the present invention (line (a)) is much more stable that the reactor operating according to the prior art process (line (b)).

Visual inspection after 6 months learned that the burner as operated in the process according the invention did not show any visible damage.

What is claimed is:

1. A process to prepare a mixture of hydrogen and carbon monoxide by performing a partial oxidation on a liquid hydrocarbon-containing feed using a multi-orifice burner provided with an arrangement of separate passages, wherein the liquid hydrocarbon-containing feed flows through a liquid hydrocarbon-containing feed passage of the burner, an oxidiser gas flows through a separate oxidiser gas passage of the burner and wherein the liquid hydrocarbon-containing feed passage for liquid hydrocarbon-containing feed and the oxidiser gas passage for oxidiser gas are separated by a moderator gas passage through which a moderator gas flows and wherein the exit velocity of the moderator gas is between 40 and 200 m/s and is greater than the exit velocity of the oxidiser gas and is at least 5 times greater than the exit velocity of the liquid hydrocarbon-containing feed.

2. A process according to claim 1, wherein the exit velocity of the moderator gas is between 40 and 150 m/s.

3. A process according to claim 1, wherein the exit velocity of the liquid hydrocarbon-containing feed is between 2 and 40 m/s.

4. A process according to claim 2, wherein the exit velocity of the moderator gas is between 60 and 120 m/s.

5. A process according to claim 1, wherein the exit velocity of the oxidiser gas is between 30 and 150 m/s.

6. A process according to claim 3, wherein the exit velocity of the liquid hydrocarbon-containing feed is between 2 and 20 m/s and exit velocity of the oxidiser gas is between 30 and 70 m/s.

7. A process according to claim 1, wherein the multi-orifice burner has from 4 to 7 passages.

8. A process according to claim 7, wherein the multi-orifice burner has 7 passages and wherein moderator gas flows through the outer most passage at a velocity of between 5 and 40 m/s.

9. A process according to claim 1, wherein the moderator gas is steam.

10. A process according to claim 1, wherein the liquid hydrocarbon-containing feed is a heavy crude oil residue, having a kinematic viscosity between 1 and 3000 cSt, as measured at the temperature of the hydrocarbon feed as it is supplied to the burner.

11. A process according to claim 1, wherein the oxidiser gas comprises of a mixture of pure oxygen having a purity of between 95 and 100 vol % and a moderator gas, wherein the content of moderator gas in such a moderator-pure oxygen mixture is between 10 and 30 wt %.

12. A process according to claim 11, wherein the velocity of the moderator gas is increased by reducing the content of moderator gas in the moderator--pure oxygen mixture and increasing the amount of moderator gas, as provided to the moderator gas passages for moderator gas, which moderator gas passage separates the liquid hydrocarbon-containing passage for the liquid hydrocarbon-containing feed and the oxidiser gas passage for oxidiser gas.

13. A process according to claim 11, wherein the velocity of the moderator gas is decreased by redirecting part of the moderator gas from the moderator gas, as provided to the moderator gas passages for moderator gas, which moderator gas passage separates the liquid hydrocarbon-containing passage for the liquid hydrocarbon-containing feed and the oxidiser gas passage for oxidiser gas, to the moderator-pure oxygen mixture.

14. A process according to claim 12, wherein the throughput of the total of moderator gas, the total of pure oxygen and the total of liquid hydrocarbon-containing feed remains substantially the same.

* * * * *